United States Patent Office 3,745,103
Patented July 10, 1973

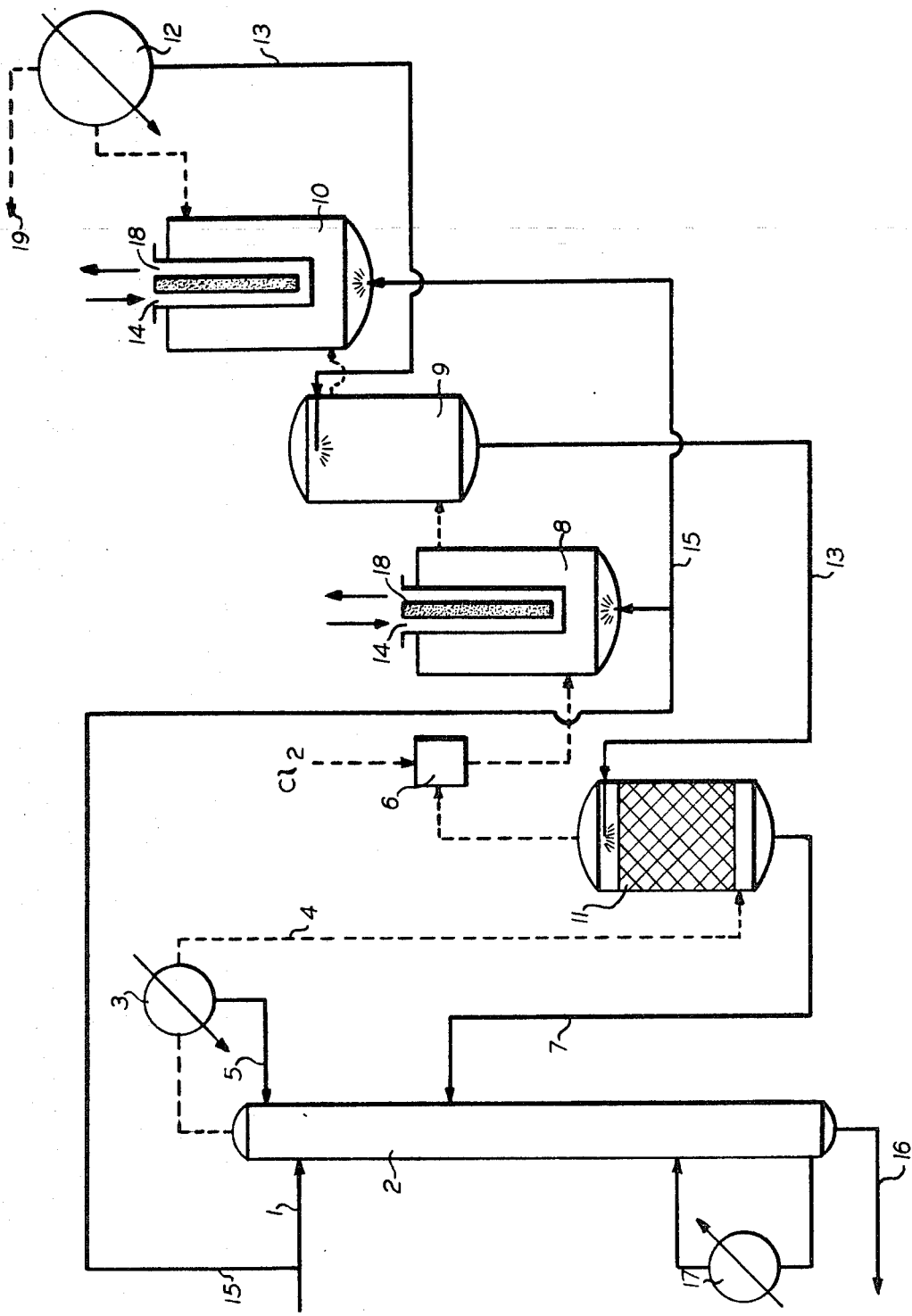

3,745,103
METHOD FOR MAKING 1,1,1-TRICHLOROETHANE BY PHOTOCHEMICAL CHLORINATION OF 1,1-DICHLOROETHANE
Hermann Richtzenhain, Schwellenbach, and Rudolf Stephan, Troisdorf-Sieglar, Germany, assignors to Dynamit Nobel Aktiengesellschaft, Troisdorf, Germany
Filed May 3, 1971, Ser. No. 139,483
Claims priority, application Germany, June 1, 1970, P 20 26 671.1
Int. Cl. B01j 1/10; C07c 17/06, 17/38
U.S. Cl. 204—163 R
10 Claims

ABSTRACT OF THE DISCLOSURE

Improvements in the photochlorination of 1,1-dichloroethane to 1,1,1-trichloroethane in the gas phase wherein the reaction between chlorine and excess dichloroethane is carried out in at least two series connected reactors each of which has an ultraviolet lamp therein, which is cooled to below the reaction temperature, wherein a quench column is disposed between each two reactors, wherein the vapor product leaving the last reactor is condensed in the condenser and the condensate subjected to distillation in order to recover desired product 1,1,1-trichloroethane and recycle 1,1-dichloroethane.

---

This invention relates to the production of 1,1,1-trichloroethane. It more particularly refers to improvements in the vapor phase photochlorination of 1,1-dichloroethane to 1,1,1,-trichloroethane.

Trichloroethane is generally, industrially made by thermally dissociating ethylene dichloride to vinyl chloride hydrochlorinating vinyl chloride to 1,1-dichloroethane, and then photochlorinating the 1,1-dichloroethane with chlorine according to the following series of equations:

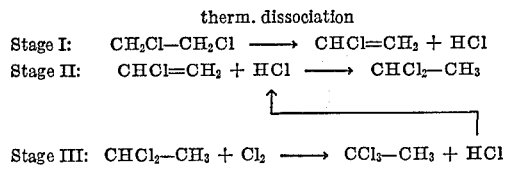

Stage I: $CH_2Cl-CH_2Cl \xrightarrow{\text{therm. dissociation}} CHCl=CH_2 + HCl$ Stage II: $CHCl=CH_2 + HCl \longrightarrow CHCl_2-CH_3$ Stage III: $CHCl_2-CH_3 + Cl_2 \longrightarrow CCl_3-CH_3 + HCl$ The third stage is preferably carried out in the gas phase using energy-rich, e.g. ultraviolet, rays (see French Pat. 1,436,453). It is reported that carrying out the third stage in this manner results in higher yields than are obtained when working in the liquid phase.

The known methods for a gas phase chlorination of 1,1-dichloroethane to 1,1,1-trichloroethane have, however, drawbacks which hamper their application on a large industrial scale.

Since the chlorination reaction is strongly exothermic, since, at temperatures above 250° C. there is attendant increased formation of higher chlorinated products and further since chlorinated ethanes tend to start decomposing at the reaction temperatures, the heat of reaction in such a gas phase chlorination must be dissipated to as great an extent as possible. According to the method set forth in French Pat. 1,390,398, such withdrawal of the heat of reaction is accomplished by cooling the reaction zone by means of a heat exchanging surface. According to this patent, it is preferred that condensed 1,1-dichloroethane serve as cooling liquid for this heat exchanging surface.

One major disadvantage of the method of this patent is that the cooling effect of this heat exchanging surface decreases in proportion to an increasing reactor diameter. There is a further drawback with the method according to this French patent in that the hydrogen chloride leaving the chlorination reaction still contains 2–4% of the originally fed chlorine. This means that there is less free hydrogen chloride for use in the second stage of the reaction. Thus, the yield of the entire process is reduced.

The output in this method amounts to only about 1 ton of 1,1,1-trichloroethane per month, per photochemical reactor. Therefore, to increase the production of a given installation it is necessary to add new photochemical reactors, each for example with a production of 1 ton/month or the like, in parallel to one or more existent reactors. Thus, according to Example 2 of the above-cited French patent, in order to produce 60 tons per month of 1,1,1-trichloroethane, 32 photochemical reactors in parallel are required. This type of operation clearly gives no advantage from a capital equipment cost point of view.

In another process (French Pat. 1,436,453), the above-mentioned drawbacks are said to be avoided in that the heat of reaction is carried away by spraying liquid 1,1-dichloroethane into the photochemical reactor. Tests carried out in a laboratory-scale apparatus according to this French patent, however, do not show improved chlorine conversion and production per reactor. Furthermore, the method of this French patent results in about 20% higher-chlorinated by-products. While by-product isomeric 1,1,2-trichloroethane (the same degree of chlorination) is useful, higher chlorinated by-products such as tetra- and pentachloro ethanes have no significant known utility and therefore they constitute an economic drain on this process.

A further drawback with the process according to French pat. 1,436,453 is that in large scale industrial applications, the source of electromagnetic radiation, i.e. the ultraviolet light source, cannot be disposed inside the reactor due to the thermal instability of produced, 1,1,1-trichloroethane. Where the lamp is disposed inside the reactor, the hot surface of the UV lamps becomes covered over with a layer of lampblack which, after only a brief period of operation of the reactor, obstructs the effective light from entering the reaction space.

It is therefore an object of this invention to provide an improved method of making 1,1,1-trichloroethane by the photochlorination of 1,1-dichloroethane.

It is another object of this invention to provide a technique for inserting a light source within a photochlorination reactor.

Other and additional objects of this invention will become apparent from a consideration of this entire specification including the claims and the drawing hereof.

In accord with and fulfilling these objects, one aspect of this invention resides in a process for photochemically converting 1,1-dichloroethane with chlorine in the gas phase to 1,1,1-trichloroethane comprising reacting a molar excess of 1,1-dichloroethane with chlorine in at least two tandem-arranged photochemical reactors with internally disposed lamps whose temperature is kept below the reaction temperature by means of transparent cooling jackets. The process further quenches gaseous reaction products coming from each photochemical reactors in quenching towers mounted between the photochemical reactors with the gaseous reaction products flowing counter-current to already condensed reaction products for a material and heat exchange. After leaving the last photochemical reactor, the gaseous reaction products are condensed in a known manner. The reaction product is then separated into its components by distillation with any still unused 1,1-dichloroethane being returned in the form of vapor to the first photochlorination reaction. It is possible, by means of this photochlorination process, to substantially remove substantially all of the drawbacks of the known methods of producing 1,1,1-trichloroethane and achieve a quantitative conversion of the chlorine (Stage III), without forming higher chlorinated by-products to any appreciable extent. This is achieved in the first place according to the present invention as a direct result of using water-jacket-cooled UV-lamps which are disposed inside the reactors. In the second place, this is achieved as a direct result of the tandem arrangement of at least two photoreactors with thereinbetween disposed quenching by already cooled down reaction gases. A tandem arrangement of two photoreactors makes it possible for the gases leaving the second photoreactor to be free from chlorine.

The reaction gases coming from a preceding reactor are cooled by the condensed and cooled reaction gases coming from the last reactor in the quenching tower. Preferably, the product from the condenser is injected at the head of the quenching towers, while the hot reaction gases coming from the preceding reactor enter the quenching towers from the bottom and, after cooling, leave the tower at the top thereof and then enter the next photoreactor, preferably from the bottom of this photoreactor. By means of these quenching towers between the photoreactors, the heat of reaction is largely dissipated so that an additional installation of heat exchanging surfaces can be dispensed with.

The gas mixture of chlorine and 1,1-dichloroethane reacting inside the photoreactors is suitably pre-mixed in the desired mole ratio and introduced as a gas mixture into the reactor. The dichloroethane can, however, also be partially in liquid form and can be sprayed into the photoreactor preferably upwardly from the lower end thereof. The reaction components entering the first reactor should be in the mole ratio of dichloroethane: chlorine of 2:1 to 5:1, preferably 3:1. It is also possible to effect the reaction with a higher proportion of dichloroethane, however, such a reactant proportion has not been found to be particularly economical.

The reaction temperature in the individual photoreactors should lie between the boiling point of dichloroethane and 220° C., preferably between 140 and 200° C.

In order to utilize to the full the effective radiation for the photochlorination, the source of rays is arranged inside the reactors. Tests on an industrial scale have shown that the surface of uncooled UV lamps, in consequence of the instability of 1,1,1-trichloroethane at high temperatures soon becomes covered, usually after only about 4 weeks of operation, with a layer of lampblack. UV-lamps disposed inside the photoreactors can then only be exposed to long periods of operation when, according to the present invention, the said UV-lamps are surrounded with a light-permeable cooling jacket, preferably a water jacket. Cooling the lamps is accomplished to the extent that the temperature of the cooling jacket is maintained below the temperature of the reaction.

As cooling liquid for the radiant source, not only water but all other known cooling liquids may be used as long as they are substantially transparent to the operative wavelengths of radiation and are not decomposed thereby. Gases can also be used as cooling means.

The equipment and arrangement of the photoreactors according to this invention leads thus not only to a quantitative conversion of the chlorine, but likewise to a roughly ten times longer period of operation of the photoreactors compared to the use of the uncooled UV-lamps without a cleaning of the lamp surface being required.

As a result of the quantitative conversion of the chlorine it becomes possible to directly process the hydrogen chloride coming from the photoreactors, e.g. for a conversion with vinyl chloride to 1,1-dichloroethane.

Since the chlorination of 1,1-dichloroethane to 1,1,1-trichloroethane can, as known, be effected in good yields only in the presence of an excess of 1,1-dichloroethane, the mixture obtained after chlorination will contain besides 1,1,1-trichloroethane large amounts of unreacted, 1,1-dichloroethane which should be recycled to the photochlorination. Prior to recycling therefore, it is necessary to effectively separate the 1,1-dichloroethane from 1,1,1-trichloroethane which, if it would be co-recycled into the photoreactor, would result in further photochlorination thereof to tetra- and pentachloro ethanes. An economical separation of the 1,1-dichloroethane from the 1,1,1-trichloroethane and its recycling into the chlorination process is achieved according to the present process in that the photoreactors are directly connected to a distillation column which is fed directly with liquid 1,1-dichloroethane. A constant amount of 1,1-dichloroethane vapor for the photochlorination is achieved preferably by setting a partial condenser which is mounted between the distilling column and the first photoreactor, to a predetermined level. The fresh 1,1-dichloroethane fed into the process is run to the head of the same distilling column in which the separation of the 1,1-dichloroethane from 1,1,1-trichloroethane and the higher chlorination products takes place and thus, there is produced the necessary feed ratios.

The reaction product mixture of 1,1-dichloroethane, 1,1,1 - trichloroethane and higher chlorination products should be free of chlorine and hydrogen chloride since the compounds would cause corrosion in the further connected apparatuses. To achieve this, the chlorination products are, prior to entering the separating column, freed from chlorine and hydrogen chloride in a tower provided with packing materials or bottoms by contacting with 1,1-dichloroethane vapour.

The method according to the present invention will now be described in greater detail with reference to the attached drawing which is a schematic view of the process of this invention in which dotted lines denote gas or vapor pipes and solid lines denote liquid-carrying pipes.

Referring to this drawing, liquid 1,1-dichloroethane is fed through a line 1 to the head of a distilling column 2. The gaseous 1,1-dichloroethane passes through a partial condenser 3 having a variable cooling effect which makes it possible to convey through a pipe 4 a constant amount of gaseous 1,1-dichloroethane to a photoreactor 8. The condensed excess of 1,1-dichloroethane passes through a line 5 back into the column 2. In a packed tower 11, the 1,1-dichloroethane vapors are, prior to their mixing with chlorine at 6, exchanged with chlorination products coming from a condenser 12 over a line 13 via a quencher 9. As a result, chlorine and hydrogen chloride coming from the quencher 9 are blown out of the system so that the chlorination products flowing from the packed tower 11 over line 7, to the column 2 do not cause any corrosion in the distillation column 2 and the partial condenser 3.

After mixing the 1,1-dichloroethane with chlorine at 6, the reaction partners enter the first photoreactor 8. The latter has a 0.25 m.³ capacity and is equipped with a 2 kw. lamp 18 which is surrounded by a cooling water means 14. Part of the freshly fed 1,1-dichloroethane can be conveyed directly to the photoreactors over a line 15 and sprayed thereinto. After the first reactor 8, the gaseous chlorination products pass into the quencher 9. Here, they come to a heat and material exchange with cold, condensable reaction products returning from the condenser 12 over a line 13. The gases cooled in the quencher 9 then enter a second photoreactor 10 which is analogous with the first reactor 8. In the condenser 12, all chlorination products are liquified with the exception of the hydrogen chloride 19. The liquified chlorination products pass over a line 13, through the quencher 9, a blowout tower 11 and a line 7 to the distillation column 2. In the latter, the unreacted 1,1-dichloroethane is returned overhead in the form of vapor to the process. All liquid chlorination products leave the bottom of the column 2 over a line 16 for the final distillation (not shown).

The following examples are illustrative of the practice of this invention without in any way being limiting thereon.

EXAMPLE I (The stated amounts of the throughput are kilograms/hour.) 84.04 kg. of 1,1-dichloroethane are pumped to the head of a distillation column 2 through a line 1. So much heating steam is conveyed to the boiler 17 of this distillation column that 252 kg. of 1,1-dichloroethane leave the partial condenser 3 as vapor and thus get into the photochlorination process stream. To this 1,1-dichloroethane 60.5 kg. chlorine are added at 6. This corresponds roughly to a molar ratio of 1,1-dichloroethane to chlorine of 3:1. The temperature in the first photoreactor rapidly rises to 170° C. The temperature of the water serving as cooling liquid for the UV-lamp in cooling jacket 14 is 16° C. at the entry and 42° C. at the exit.

After leaving the first photoreactor, the gas contains now only 6 kg. of chlorine, i.e. 90% of the chlorine has already reacted in the first reactor. The 170° C. hot gases then enter the quenching tower 9 where they are cooled down to 90° C. by counterflowing condensate. The temperature rise in the second photoreactor 10 is 60° C. The vapors pass into condenser 12 at 150° C. The hydrogen chloride leaving the condenser is free of chlorine. 281 kg. of chlorination products are passed through line 7 to the distillation column 2, the reacted 1,1-dichloroethane content of which gets back through the overhead of column 2 into the photochlorination. From the base of the column 2, 113.3 kg. are collected.

Composition of the base product

|  | Percent by weight |
|---|---|
| 1,1,1-trichloroethane | 79.5 |
| 1,1,2-trichloroethane | 17.0 |
| Higher-chlorinated, preponderantly tetra- and pentachloro ethanes | 3.5 |

The production in the aforedescribed apparatus with only two tandem photoreactors is 90 kg./h. of 1,1,1-trichloroethane. At continuous operation, the apparatus worked for 14 months without significant stoppage.

The same installation has to be stopped about every 4 weeks when using uncooled lamps in order to remove lampblack from the surface of the lamp.

EXAMPLE II

Using the same amounts of chlorine and 1,1-dichloroethane as in Example I and in the same apparatus, 64 kg. of 1,1-dichloroethane were fed in at 1, while 20.04 kg. of liquid 1,1-dichloroethane are conveyed over the pipe 15 directly to the first photoreactor 8 and sprayed thereinto. As a result, a temperature of 130° C. occurs in this reactor.

After quenching the chlorination products in 9, their temperature prior to entry into the second reactor 10 is 80° C. On leaving the second reactor 10, the reaction products have been heated up to 125° C. The bottom product drawn off at 16 has the following composition:

|  | Percent by weight |
|---|---|
| 1,1,1-trichloroethane | 81.5 |
| 1,1,2-trichloroethane | 15.5 |
| Higher-chlorinated ethanes | 3.0 |

What is claimed is:

1. In the process of producing 1,1,1-trichloroethane by the gas phase chlorination of 1,1-dichloroethane with chlorine in the presence of ultraviolet radiation, the improvement which comprises introducing chlorine and 1,1-dichloroethane into two separate photoreaction vessels comprising a first reaction vessel and a second reaction vessel each of which is provided with a source of ultraviolet radiation, which source is externally cooled removing gaseous product from the first of said reaction vessels and passing it into a quencher, removing gaseous product from the second reaction vessel and condensing 1,1,1-trichloroethane contained therein and separating the same from HCl and passing the condensate into said quencher, directing the vapor from the first reactor in countercurrent intermingling flow with said condensate in said quencher, recovering from said quencher a liquid fraction, separating from said liquid fraction unreacted 1,1-dichloroethane, recycling said unreacted 1,1-dichloroethane to said first reactor and passing a gaseous product from said quencher into said second reactor.

2. The improved process claimed in claim 1 including distilling the reaction product produced by said process and adding liquid makeup 1,1-dichloroethane to said distillation.

3. The improved process claimed in claim 1 including distilling the reaction product produced by said process, adding liquid makeup 1,1-dichloroethane to said distillation and directly to said first reaction vessel.

4. The improved process claimed in claim 2 including partially condensing the distillate from said distillation to an extent sufficient to provide a substantially constant supply of vaporous 1,1-dichloroethane to said first reaction vessel.

5. The improved process claimed in claim 2 including separating chlorine and hydrogen chloride from said reaction products prior to distilling said reaction products.

6. The improved process claimed in claim 5 including passing the reaction product countercurrent to vaporous 1,1-dichloroethane from the first reaction vessel in order to separate said chlorine and hydrogen chloride therefrom.

7. The improved process claimed in claim 1 carried out between the boiling point of 1,1-dichloroethane and 220° C.

8. The improved process claimed in claim 1 carried out at 140 to 200° C.

9. The improved process claimed in claim 1 using a feed having a mole ratio of 1,1-dichloroethane to chlorine of 2:1 to 5:1.

10. The improved process claimed in claim 1 using a feed having a mole ratio of 1,1-dichloroethane to chlorine of 3:1.

References Cited

UNITED STATES PATENTS

| 3,019,175 | 1/1962 | Haefner et al. | 204—163 |
| 3,126,419 | 3/1964 | Burks, Jr. et al. | 204—658 R |
| 3,474,018 | 10/1969 | Goeb et al. | 204—163 R |
| 3,405,046 | 8/1968 | Sennewald et al. | 204—163 R |

FOREIGN PATENTS

| 1,102,417 | 1968 | Great Britain | 204—163 R |
| 1,247,287 | 1967 | Germany | 204—163 R |
| 1,390,398 | 1964 | France | 204—163 R |
| 1,817,191 | 8/1969 | Germany | 260—658 R |

BENJAMIN R. PADGETT, Primary Examiner

R. GAITHER, Assistant Examiner

U.S. Cl. X.R.

260—658 R, 658 C